United States Patent [19]

Enein

[11] Patent Number: 4,677,442
[45] Date of Patent: Jun. 30, 1987

[54] MICROWAVE LANDING SYSTEM WITH ±90 DEGREE AZIMUTH CLEARANCE GUIDANCE AND 360 DEGREE DATA COVERAGE

[75] Inventor: Mohamed Enein, Northport, N.Y.

[73] Assignee: Hazeltine Corporation, Commack, N.Y.

[21] Appl. No.: 614,608

[22] Filed: May 29, 1984

[51] Int. Cl.$^4$ .......................... G01S 1/16; G01S 1/18
[52] U.S. Cl. ..................................... 342/410; 342/35; 342/412
[58] Field of Search .................... 343/410, 456, 5 GC, 343/5 LS, 412, 407; 342/35

[56] References Cited

U.S. PATENT DOCUMENTS

| | | | |
|---|---|---|---|
| 3,255,900 | 6/1966 | Graham | 343/456 X |
| 3,262,111 | 7/1966 | Graham | 343/456 X |
| 3,852,749 | 12/1974 | Kohler | 343/410 X |
| 4,306,239 | 12/1981 | Enein | 343/373 X |
| 4,429,312 | 1/1984 | Chisholm | 343/410 |

OTHER PUBLICATIONS

"Aeronautical Communications" International Civil Aviation Organization, 4th Ed., vol. 1, Apr. 1985, pp. 160-2B-1.

Primary Examiner—Theodore M. Blum
Assistant Examiner—John B. Sotomayor
Attorney, Agent, or Firm—E. A. Onders; F. R. Agovino

[57] ABSTRACT

A microwave landing system incorporates a set of antennas for the sequential transmission of guidance signals through a sequence of directions to enable the reception and decoding of the signals by an airborne receiver. Circuitry is included for the retransmission of a frame of the signals by a procedure wherein the directions of transmissions is altered so as to increase the guidance sector over which the receiver is effective.

30 Claims, 13 Drawing Figures

SEQUENCE A

| SEQUENCE #1 | TIME (ms) | SEQUENCE #2 |
|---|---|---|
| APPROACH ELEVATION | 0 | APPROACH ELEVATION |
| HIGH RATE APPROACH AZIMUTH | 10 | HIGH RATE APPROACH AZIMUTH |
| 4 BASIC DATA WORDS (NOTE 1) * | 20 | (NOTE 2) |
| HIGH RATE APPROACH AZIMUTH | 30 | BACK AZIMUTH |
| APPROACH ELEVATION | 40 | HIGH RATE APPROACH AZIMUTH |
| HIGH RATE APPROACH AZIMUTH | 50 | APPROACH ELEVATION |
| APPROACH ELEVATION | 60 | HIGH RATE APPROACH AZIMUTH |
|  | 64.9 | APPROACH ELEVATION |
|  | 67.5 |  |

SEQUENCE B

| SEQUENCE #1 | TIME ms | SEQUENCE #2 |
|---|---|---|
| APPROACH ELEVATION | 0 | APPROACH ELEVATION |
| HIGH RATE APPROACH AZIMUTH | 10 | HIGH RATE APPROACH AZIMUTH |
| 4 BASIC DATA WORDS (NOTE 1) ** | 20 | (NOTE 2) |
| HIGH RATE APPROACH AZIMUTH | 30 | BACK AZIMUTH |
| APPROACH ELEVATION | 40 | HIGH RATE APPROACH AZIMUTH |
| HIGH RATE APPROACH AZIMUTH | 50 | APPROACH ELEVATION |
| APPROACH ELEVATION | 60 | HIGH RATE APPROACH AZIMUTH |
|  | 64.9 | APPROACH ELEVATION |
|  | 67.5 |  |

SEQUENCE C

| SEQUENCE #1 | TIME (ms) | SEQUENCE #2 |
|---|---|---|
| APPROACH ELEVATION | 0 | APPROACH ELEVATION |
| HIGH RATE APPROACH AZIMUTH | 10 | HIGH RATE APPROACH AZIMUTH |
| 4 BASIC DATA WORDS (NOTE 1) *** | 20 | (NOTE 2) |
| HIGH RATE APPROACH AZIMUTH | 30 | BACK AZIMUTH |
| APPROACH ELEVATION | 40 | HIGH RATE APPROACH AZIMUTH |
| HIGH RATE APPROACH AZIMUTH | 50 | APPROACH ELEVATION |
| APPROACH ELEVATION | 60 | HIGH RATE APPROACH AZIMUTH |
|  | 64.9 | APPROACH ELEVATION |
|  | 67.5 |  |

\* FWD IDENT ANTENNA (4)

\*\* L & R OCI ANTENNAS (2,7)

\*\*\* REAR OCI ANTENNA (1)

FIG. 3

NOTES:
1. BASIC DATA WORDS MAY BE TRANSMITTED IN ANY OPEN TIME PERIODS.
2. WHEN BACK AZIMUTH IS PROVIDED, BASIC DATA WORD #2 MUST BE TRANSMITTED ONLY IN THIS POSITION.

MICROWAVE LANDING SYSTEM WITH ±90 DEGREE AZIMUTH CLEARANCE GUIDANCE AND 360 DEGREE DATA COVERAGE

BACKGROUND OF THE INVENTION

This invention relates to microwave landing systems for aircraft and, more particularly, to a system including a set of antennas wherein data signals are transmitted in plurality of directions between frames of the transmission of guidance signals.

Microwave landing systems are widely used at airports throughout the world. The systems incorporate a set of antennas arranged in a cluster, and pointing in different directions for the radiation of guidance signals to aircraft at all directions of azimuth around the airport. A beam of electromagnetic energy is directed in the forward direction, looking down the runway at an incoming aircraft. This beam scans to and fro over a sector of azimuth to provide a highly accurate azimuth guidance signal for the aircraft. To both the left and right sides of the foregoing sector, if the sector coverage is less than ±40°, there are provided clearance sectors in which the aircraft is directed to the right or to the left for entering the central sector. At all other azimuth directions, the aircraft receives signals indicating that it is in a region which is out of coverage of the foregoing guidance signals, and accordingly, provides protection against false guidance.

A feature in the generation of the frames of signals which guide the aircraft is the use of time multiplexing of successive signals wherein the preamble of each time slot is used to identfy what signal is being received. Adequate time is presented in the pre-amble signal so as to give a receiver in the aircraft opportunity to lock onto and process the individual signals. At the inception of each frame of transmission of signals, there is transmitted a digital data message by modulating the carrier of the electromagnetic wave with differential phase shift keying (DPSK), the message identifying the nature of the transmission as well as providing a synchronization reference point for the subsequent signals to be transmitted in the frame of guidance signals. The remaining signals are simply scanning beam or clearance pulses of the carrier signal, which pulses emanate from specific ones of the antennas at specific instance of time. The data signal is transmitted through a forwardly directed antenna so as to provide the identification and synchronization at the inception of each signal frame for the incoming aircraft. Aircraft located at other directions around the airport may also receive the data signal if the signal is reflected from the terrain or building in other directions. Otherwise, the data signal is not received by the other aircraft. Only those aircraft receiving the data and synchronization signal can respond to the subsequent signals of the signal frame. All of these transmissions are in accordance with an international convention on aircraft operation, the governing organization establishing these standards being often referred to as the International Civil Aviation Organization (ICAO).

Differences exist in the nature of the equipment which may be available at various airports for implementing the microwave landing system (MLS). The basic system provides spacing between the signal frames to permit the transmission of an additional frame of signals, which additional frame is available from additional equipment provided by more advanced systems. Thus, in addition to the azimuth and elevation guidance available from the standard system, the advanced system includes further equipment for the transmission of highly accurate elevation guidance (flare guidance) as well as back-azimuth guidance which enable the reception of guidance in directions other than only the forward direction. Thus, in the advanced system, all of the frames are utilized, there being no empty signal frames. However, in the standard system, alternate frames are empty, and simply serve as dead time during which the system is inactive.

A problem arises in that the foregoing standard system provides for the transmission of data and clearance signals in only the certain forward sectors of the antenna transmission patterns. Preferably, such signals should also be transmitted in other directions so as to enable aircraft to more rapidly reach the path for landing on the runway. However, the use of onmidirectional antennas and the increased power required for the operation of such antennas would result in an undesirable high cost to the equipment.

SUMMARY OF THE INVENTION

The foregoing problem is overcome, and other advantages are provided by microwave system for the landing of aircraft wherein, in accordance with the invention, the unused signal frames of the standard system are employed for the transmission of data and clearance signals from other antennas not normally used in the transmission of the data and clearance signals. Since the transmitter is not being utilized during the dead time, such utilization of the unused frames does not require any increase in peak power of the transmitter. All that is required is additional signal switching among the antennas, as well as the generation of these additional signals, none of which requires the expense asssociated with the implemenation of relatively high power from omnidirectional antennas.

The standard format frames of the signal transmission provide the transmissions of the standard system, including both azimuthal and elevation guidance signals. The unused frames of the standard system are utilized for transmission of the information, transmitted from other antennas to serve as supplemental signal frames for more complete azimuthal coverage of the space surrounding an airport. The circuitry of the invention utilizes existing microwave switching equipment and transmission equipment of the standard system, the circuitry including further circuitry responsive to the system timing signals for operation of the switching circuitry to direct the requisite signals from the transmitter to the desired ones of the antennas at the requisite instants. This enables the airborne receiver to provide data and guidance signals to the aircraft even when the aircraft is behind or to the side of the antenna cluster. The invention thus includes the additional circuitry as well as the method of transmitting additional sequences of guidance signals during the supplemental frames.

It is recognized that, even in the case of the advanced system, there is still available time in the sequence of signal frames for the additional transmission of data signals. However, there is insufficient available time for the transmission of the clearance supplemental frames in order to extend the guidance coverage. Thus, the invention may be implemented in one mode of operation which provides for an extension of the data coverage to a full 360° of azimuth coverage while, in the second mode of operation, the invention provides for both the increased data coverage as well as an increase in the clearance coverage to ±90° in azimuth.

BRIEF DESCRIPTION OF THE DRAWINGS

The aforementioned aspects and other features of the invention are explained in the following description, taken in connection with the accompanying drawings wherein.

DETAILED DESCRIPTION

Figure 1:
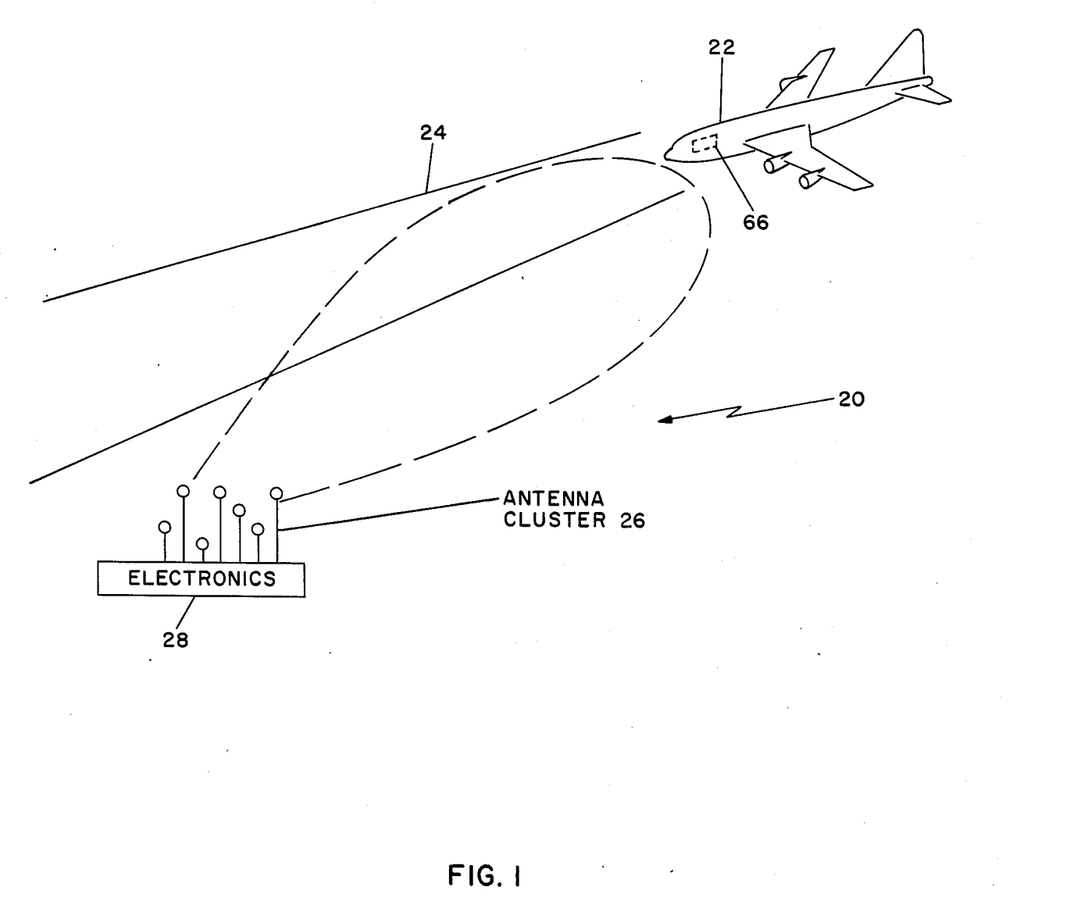
FIG. 1 is a stylized view of an aircraft landing at a runway equipped with a microwave landing systems incorporating the invention.

As depicted in FIG. 1, a microwave landing system 20 guides an aircraft 22 to a landing on a runway 24 with the aid of guidance signals transmitted from the antennas of an antenna cluster 26 and generated within electronics equipment 28 coupled to the cluster 26.

Figure 2:
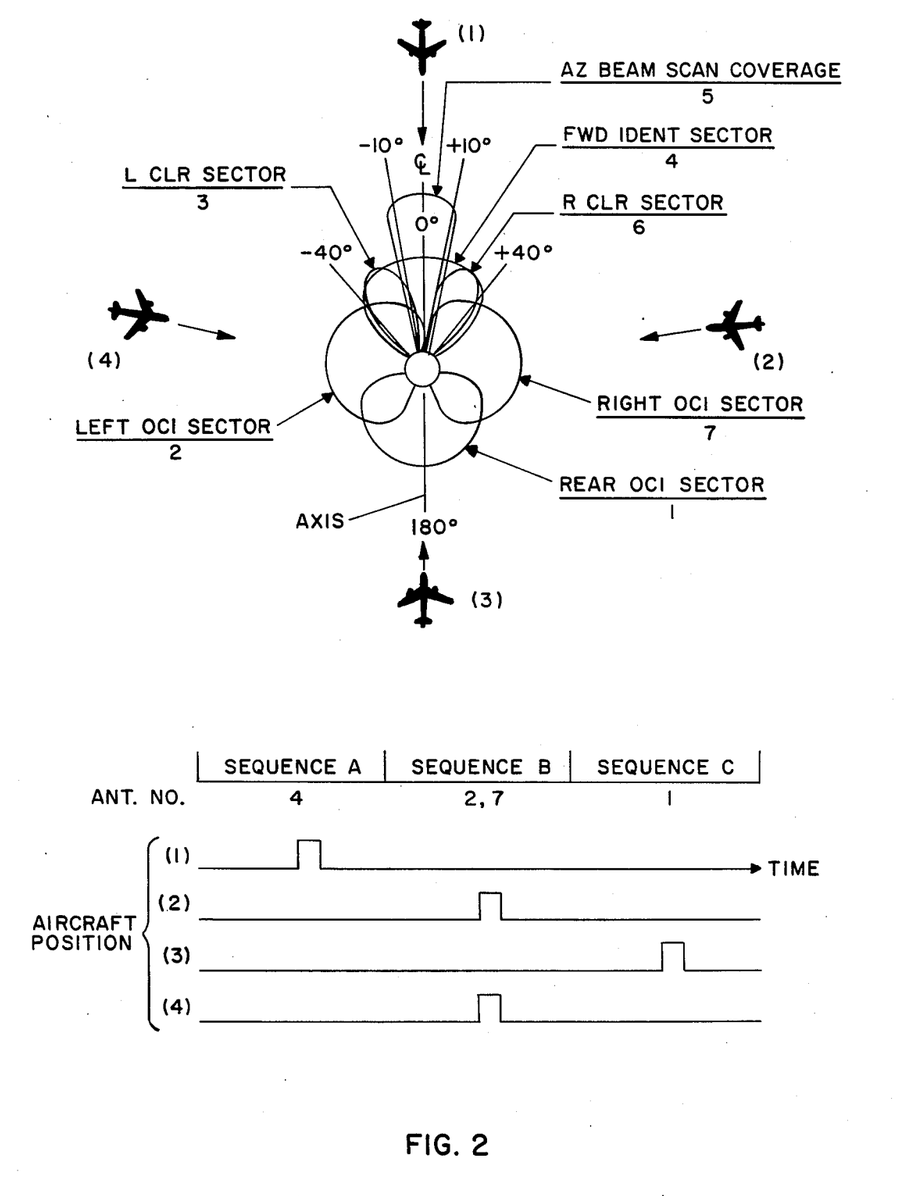
FIG. 2 shows the radiation patterns for the cluster of seven antennas of FIG. 1, the figure further showing four aircraft approaching from different directions and a graph displaying the times of reception of additional data provided by sequences of signal frames in accordance with one aspect of the invention.

With reference also to FIG. 2, individual ones of the antennas of the cluster 26 direct their radiation patterns in predetermined directions so as to provide for radiation in the rear and also to both sides of the central axis of the raditation pattern. The central axis is parallel to the runway 24. In particular, there are seven antennas as identified in FIG. 2, each with its own radiation pattern. The first, second and seventh antennas are utilized to provide an out of coverage indication (OCI) to the aircraft 22. The third and sixth antennas radiate into sectors disposed to the left and to the right of the axis to provide left and right clearance signals to the aircraft 22 for guiding the aircraft towards the axis. The fourth antenna radiates through a sector positioned symmetrically about the axis for the transmission of data and synchronization signals to the aircraft 22. The fifth antenna provides an azimuth scanning beam for the precise guidance of the aircraft 22 down to the runway 24.

In accordance with the invention, the existing MLS antennas with their radiation patterns, as depicted in FIG. 2, are utilized for the transmission of both the sequence of signal frames of the standard MLS plus the additional signal frames of the invention to provide for the increased azimuth coverage. This coverage includes 360° of azimuth coverage of the data signals for both the standard and the advanced MLS. In the case of the standard MLS, the invention provides furthermore for an extension of the coverage from the 40° clearance sector depicted in FIG. 2 out to a 90° clearance sector at both the right and the left sides of the axis. As to whether only the data coverage improvement is provided, or whether there is also provided the improved clearance coverage, depends on the amount of time available in the sequences of MLS signal frame transmissions. Thus, in the standard system which does not provide for the transmission of flare and back azimuth functions, there is sufficient time available to incorporate both the improvements in the data coverage and in the clearance coverage. However, in advanced MLS which incorporates the flare function or high rate azimuth as well as the back azimuth transmission, the available time permits only the implementation of the improvement in data coverage.

Figure 3:
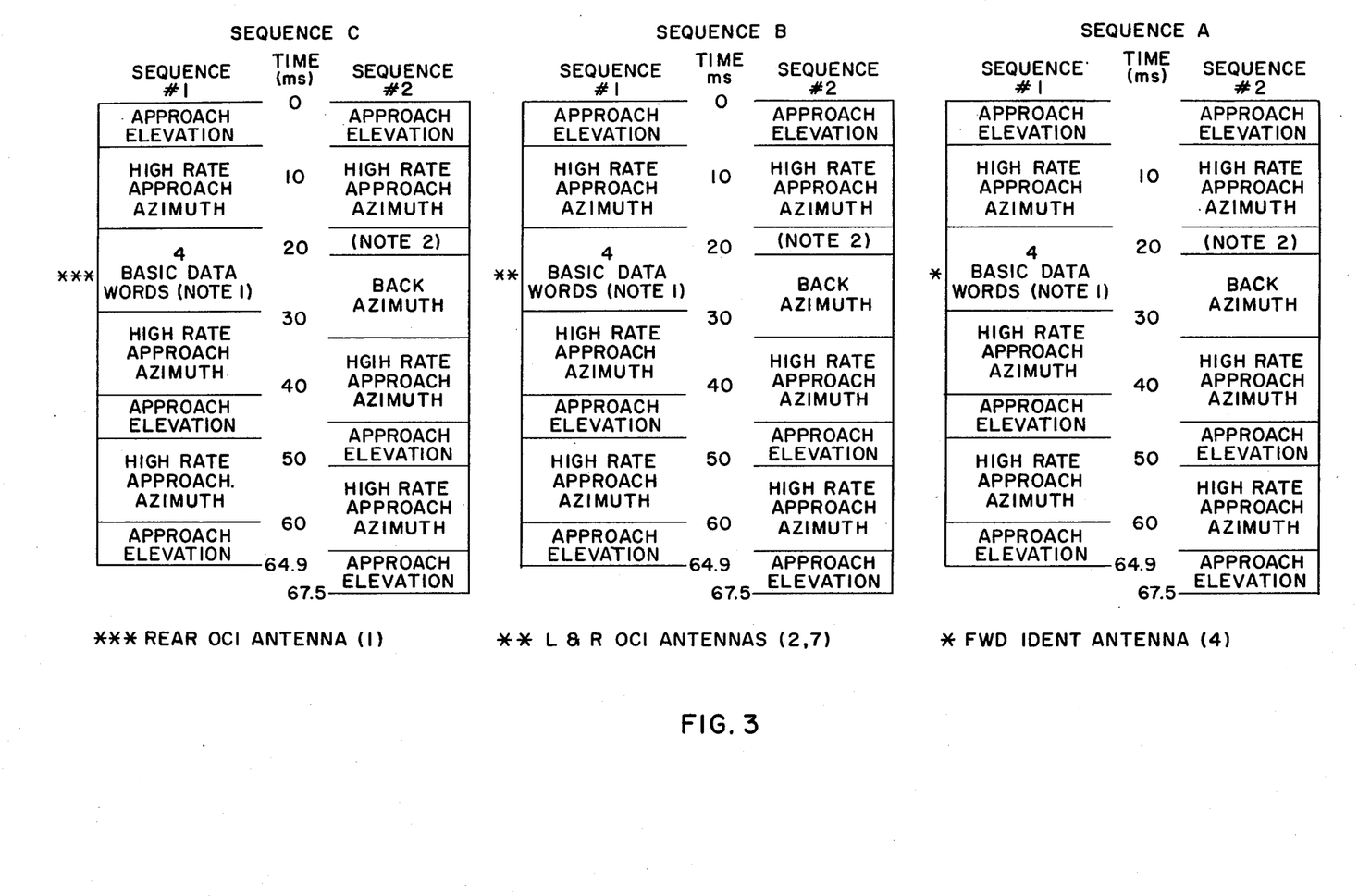
FIG. 3 is a chart showing three groups of sequences referred to in FIG. 2 for 360° azimuth data coverage in combination with high rate 40° azimuth coverage.

With reference also to FIG. 3, there is shown a set of transmission sequences which provide for 360° of coverage of the data signals in a high rate azimuth signal format. The guidance coverage remains at 40° since there is insufficient time available for a supplemental frame to extend the clearance signals coverage. Each sequence includes both elevation and azimuth guidance by the invention. The "high rate approach azimuth" refers to a frame of signals normally utiliZed in both the standard and the advanced MLS. FIG. 3 shows three groups of sequences, the second sequence in each group including "back azimuth" transmission, such transmission being deleted in the first sequence in each group. Accordingly, the first sequence in each group has more time available for the transmission of data than does the second sequence in each group. In each group the total time duration of the first sequence plus the second sequence is not to exceed 134 ms (milliseconds), as is required by ICAO.

The invention provides for the 360° data coverage by the transmission of additional data words in available time intervals of a sequence by use of additional ones of the antennas of the cluster 26. Thus, while the sector covered by the fourth antenna is utilized for the forward transmission of data as well as identifying the function being transmitted, the invention provides for a further transmission by use of the second and seventh antennas, as well as by the first antenna. The three groups of sequences are identified by the letter A, B and C in FIG. 3, these same sequences being identified in FIG. 2. In FIG. 2, beneath each of the sequences, is provided a listing of the antennas through which the respective transmissions are radiated. Thus, the diagram of FIG. 2 shows the time of transmission of data by sequence A from the fourth antenna, the transmission of data by sequence B via the second and seventh antennas, and the transmission of data by the sequence C by the first antenna. It is noted that the first, the second and the seventh antennas are normally utilized for transmitting a pulse signal designating OCI, the out of coverage indication. The data words may be transmitted in any open time intervals and, by way of example, are shown transmitted in different time intervals for each of the sequences A, B and C. The first aircraft is located forward of the cluster 26 and, accordingly, receives the transmission of the fourth antenna. The second and fourth aircrafts receive simultaneous transmissions of the second and seventh antennas, these being the left and right OCI antennas. The third aircraft is located behind the cluster 24 and, accordingly, receives data transmission from the first antenna, this being the rear OCI antenna. In particular, it is noted that the arrangement depicted by the timing graphs of FIG. 2 in combination with the sequences set forth in FIG. 3 provides data signals to all four of the aircraft depicted in FIG. 2, this being a full 360° of data coverage. Thus, the invention has time shared the use of OCI antennas for both OCI transmission and for data transmission. The time sharing has been accomplished by utilization of the sequences of transmissions set forth in FIG. 3.

Figure 4:
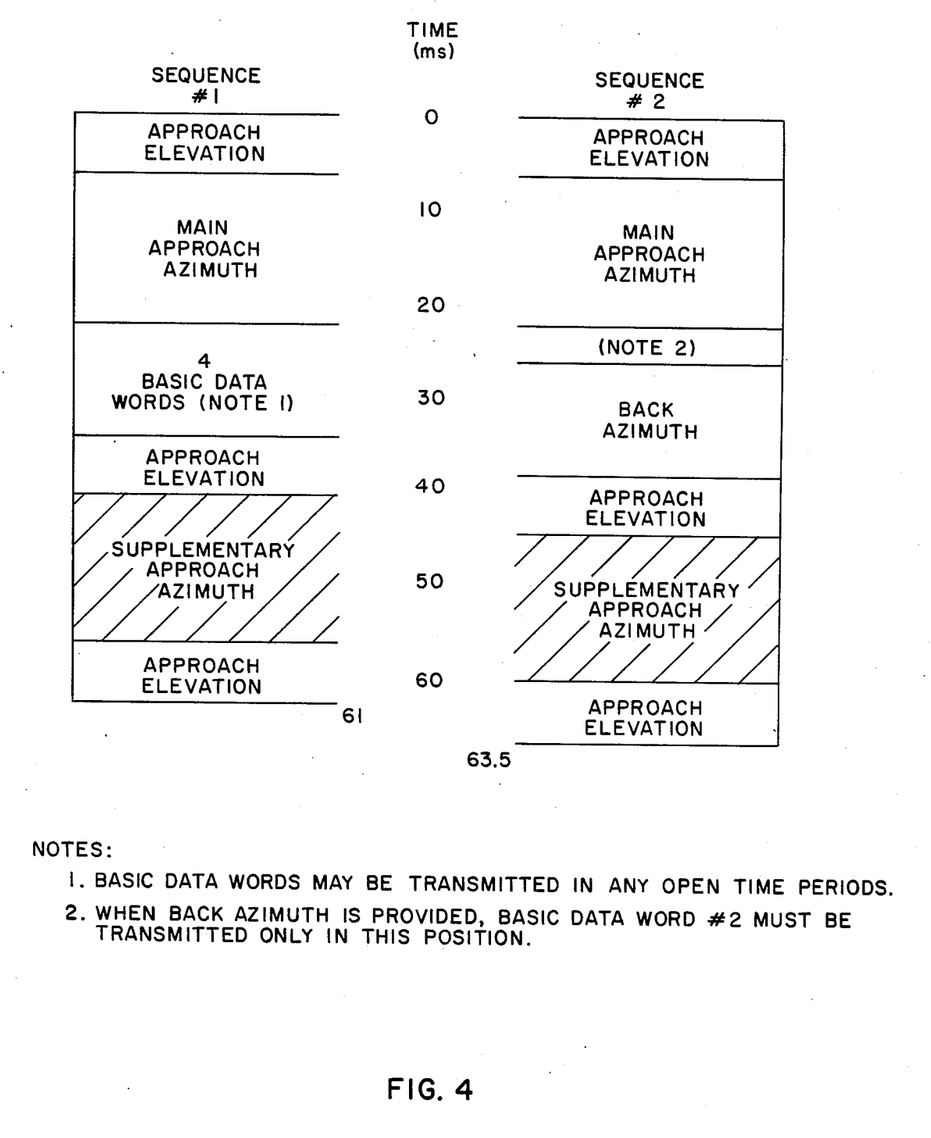
FIG. 4 shows one pair of signal frames for the radiation patterns depicted in FIG. 2 wherein supplementary azimuth frame are applied to increase the clearance coverage to 90° on either side of the center line of the array of FIG. 2.

With reference also to FIG. 4, there are shown two sequences of transmission of signal frames by an MLS incorporating the invention. The sequences of FIG. 4 are with reference to the utilization of a standard MLS having sufficiently long time intervals therein to accomodate a supplementary azimuth approach frame for the transmission of additional azimuth guidance signals. The supplemental frame has sufficient duration to accommodate both the transmission of data and the transmission of clearance signals and is in place of high rate azimuth guidance. Thus, by use of the sequences of FIG. 4, in combination with the appropriate selection of antennas as will be described subsequently in FIGS. 5 and 6, the aircrafts of FIG. 2 are able to receive clearance signals extending out to 90° on either side of the axis in lieu of the 40° sectors depicted in FIG. 2. This is accomplished without any alteration of the elevation or the azimuth signals normally provided during each sequence for the guidance of the aircraft.

Figure 5:
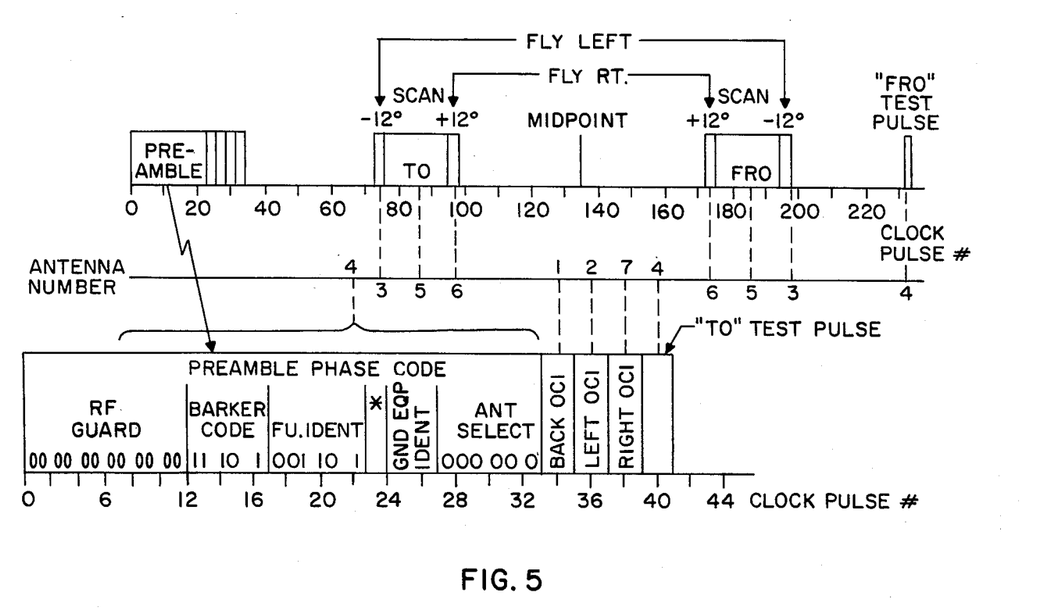
FIG. 5 is a timing diagram of the signals transmitted during a normal azimuth frame.
Figure 6:
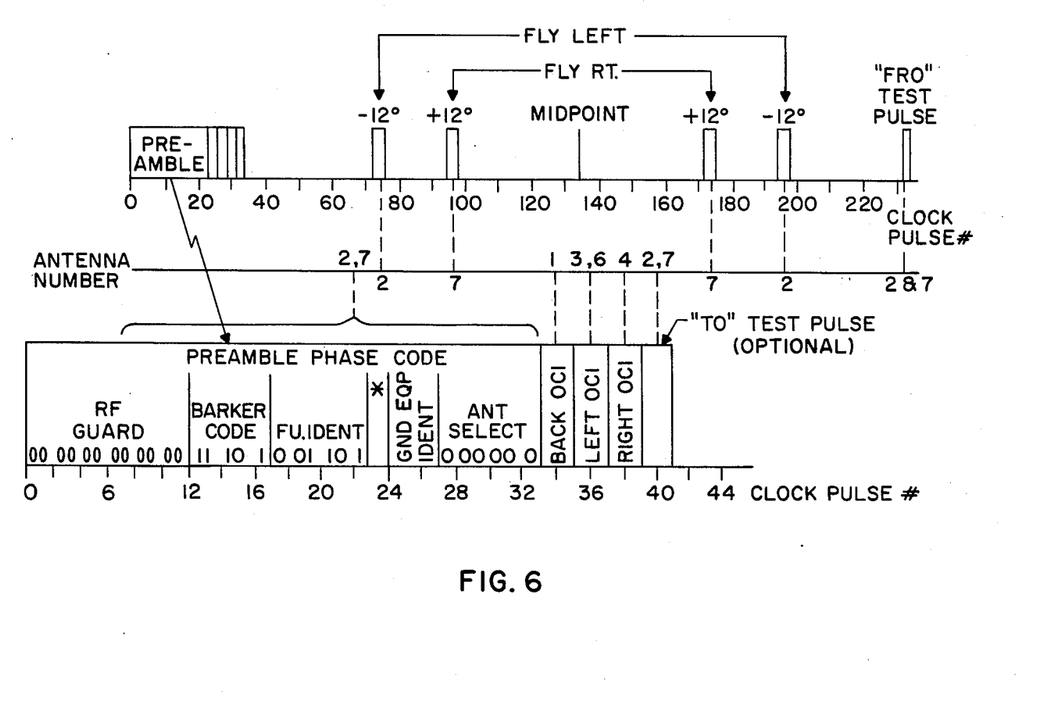
FIG. 6 is a timing diagram of signals transmitted during a supplementary azimuth frame of FIG. 4.

As shown in the timing diagrams of FIGS. 5 and 6, the normal azimuth signal frame and the supplementary azimuth signal frame both include a preamble followed by OCI pulses, then clearance pulse signals ordering the aircraft to fly left or right. The format of the frames of FIGS. 5 and 6 differ with respect to the utilization of the antennas in the transmission of the respective signals in each frame. Thus, the normal frame of FIG. 5, which is utilized in an MLS irrespectively of whether or not the invention is employed, provides for transmissions by individual ones of the antennas of the cluster 26, the numbers of the antennas being set forth in FIG. 2 and also being shown in FIG. 5. The time base in FIGS. 5 and 6 is in terms of clock pulses which occur at a rate of 15 KHz (kilohertz). The preamble is in the form of a phase shift modulation of the carrier waveform, the phase shift being accomplished by differential phase shift keying. Such a form of modulation is well known and is in current use in MLS. The preamble includes a sequence of logic digits which serve to synchronize a clock within the receiver carried by the aircraft 22. Also included in the phase modulated preamble is a code word identifying the functions, such as azimuth, ground equipment identification, and an antenna selection word. Immediately following the preamble are three pulses of the carrier, these pulses containing no phase of frequency modulation, which are transmitted sequentially by each of the OCI antennas. A further slot is left for a test pulse of future systems, and is not utilized at present.

A comparison of FIGS. 5 and 6 shows that in the normal frame of FIG. 5, the preamble is transmitted by the fourth antenna, this being the forward looking antenna which provides the identification data. During the supplementary frame of FIG. 6, the preamble is transmitted via the second and seventh antennas, these being respectively the left and the right OCI antennas. Following the transmission of the preamble, the back OCI pulse is transmitted from the first antenna in the case of both the normal frame of FIG. 5 and the supplementary frame of FIG. 6. In the normal frame of FIG. 5, left and right OCI information are transmitted respectively via the second and the seventh antennas. However, in the supplementary frame of FIG. 6, the OCI pulses are shared between the combination of the third and sixth antennas and the fourth antenna so as to provide for a forwardly directed transmission of left OCI and right OCI information.

It is noted that the OCI pulses do not give directional information to the aircraft. They serve simply as reference signals against which the clearance and scanning beam signals are compared, the clearance signals being effective in directing the aircraft only when the clearance signals are greater than the OCI signals. This is an important consideration in multipath situations wherein the signal may be received with apparent strength from a direction other than that in which it was transmitted. This consideration will be further described hereinafter.

As shown in the frames of both FIGS. 5 and 6, the pulses of the clearance signals directing the aircraft to fly to the left or to the right appear twice during each frame. In the normal frame, the "fly left" pulses are radiated from the third antenna this being at the left clearance sector, while the "fly right" pulses are transmitted from the sixth antenna, this being at the right clearance sector. In the supplementary frame of FIG. 6, the corresponding transmissions of the left and right clearance pulses occur from the second and the seventh antenna, these being respectively at the left OCI sector and the right OCI sector. In the supplementary frame, by utilization of the reference OCI transmissions in the forward direction, the comparison can be made between the clearance pulses of the second and seventh sectors to extend the range of clearance commands from the 40° sectors of FIG. 2 out to the foregoing 90° at each side of the central axis of the radiation pattern of FIG. 2.

Thereby, in the case of the standard MLS wherein there is an interval of time sufficient for the supplementary signal frame, the invention providing for the clearance coverage out to the foregoing 90°. In both the standard MLS and the advanced MLS, there is a sufficient time interval for the transmission of additional data signals. Thereby, the invention provides for 360° coverage of the data.

Figure 7:
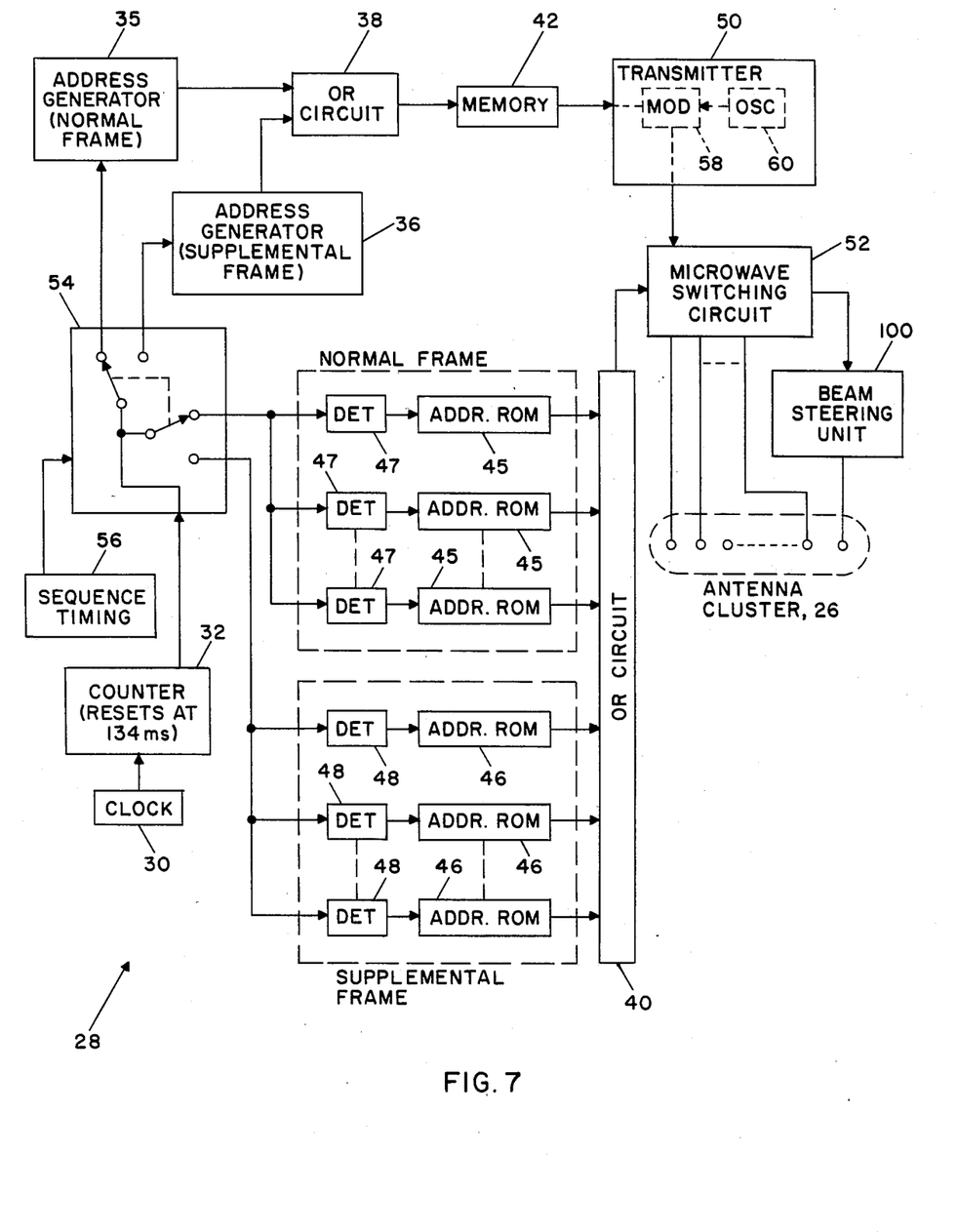
FIG. 7 is a simplified block diagram of circuitry utilized in the electronics equipment of FIG. 1 for the generation of signals to be radiated by the antennas.

In FIG. 7 there is presented a simplified diagram showing components of the electronics equipment 28 of FIG. 1. The equipment 28 comprises a clock 30, a counter 32, address generators 35-36, OR circuits 38 and 40, a memory 42, a set of read-only memories (ROM) 45, a set of read-only memories 46, a set of detectors 47 of counts of the counter 32, a set of detectors 48 and counts of the counter 32, a transmitter 50, and a microwave switching circuit 52 which couples the transmitter 50 the antenna cluster 26 of FIG. 1.

In operation, the counter 32 counts clock pulses of the clock 30, and applies the output count to the address generators 35–36 and then to the set of detectors 47–48 via a switch 54 operated by a sequence timing unit 56. The switch 54 has two sections which are ganged together, one section connecting the generators 35–36 to the counters 32 while the other section connects the sets of detectors 47–48 to the counter 32. Individual ones of the detectors 47 connect with the memory 45, and individual ones of the detectors 48 connect with the memories 46. The memories 45 and 46 are coupled by the OR circuit 40 to the switching circuit 52. The address generators 35 and 36 are coupled by the OR circuit 38 to the memory 42 for operation of the transmitter 50.

During a normal frame, the address generator 35 is coupled by the switch 54 to be responsive to the count of the counter 32 for generating address signals which are coupled by the OR circuit 38 to address the memory 42. During the supplementary frame, the address generator 36 is connected by the switch 54 to be responsive to the count of the counter 32 for generating address signals which are coupled by the OR circuit 38 to address the memory 42. During the normal frame, the detectors 47 are connected by the switch 54 to be responsive to the count of the counter 32 for triggering the corresponding memories 45. During the supplementary frame, the detectors 48 are connected by the switch 54 to be responsive to the count of the counter 32 for triggering the respective memories 46.

The memory 42 stores the information necessary for generating the signals of the normal frame, depicted in FIG. 5 and the supplementary frame depicted in FIG. 6. By addressing the memory 42 at the appropriate instants of time, the individual digits of the preamble are applied to the transmitter 50 wherein they are modulated by a modulator 58 onto a carrier provided by an oscillator 60. The resultant modulated rf (radio frequency) carrier is then coupled by the switching/circuit 52 to selected ones of the antennas of the cluster 26. The addressing of the memory 42 during the normal frame is provided by the generator 35, while the addressing of the memory 42 during the supplemental frame is provided by the generator 36.

Each of the detectors 47 and 48 comprise logic circuitry for detecting the presence of a specific one of the counts of the counter 32, each of the detectors 47 being preset to respond to a predesignated one of the counts and similarly, the detectors 48 are preset to respond to predetermined ones of the counts of the counter 32. Thereby, each of the detectors 47 and each of the detectors 48 provide output trigger signals to their corresponding memories 45–46 to trigger these memories to provide corresponding addresses via the OR circuit 40 to operate the switching circuit 52. The switching of the signal of the transmitter 50 to the antennas of the cluster 26, as set forth in the diagrams of FIGS. 5 and 6, is accomplished by addressing the switching circuit 52 at the designated instants of time, as set forth in FIGS. 5 and 6, to couple the designated antennas to the transmitter 50. The circuit of FIG. 7 thus accomplishes the desired selection of the antennas and the desired signal transmission for both the normal frame and the supplementary frame, the mode of operation of the circuitry of the electronics equipment 28 being selected by the position of the switch 54 to provide for the normal frame and the supplementary frame.

Figure 8:
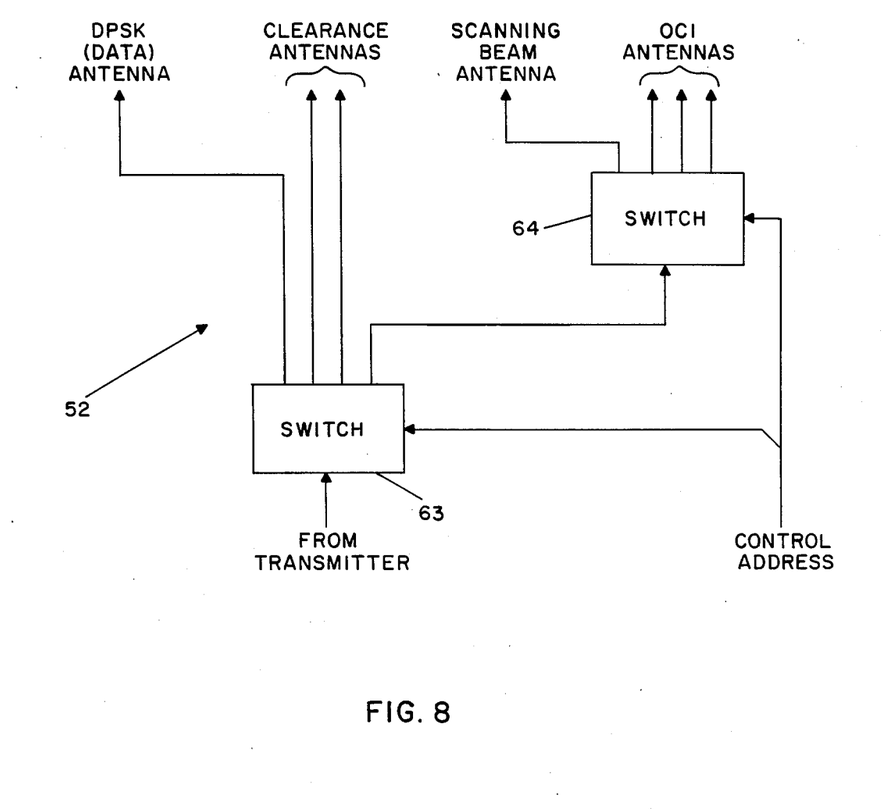
FIG. 8 is a block diagram showing details of switching circuitry of FIG. 7.

With reference also to FIG. 8, there is shown a further detail of the switching circuit 52 of FIG. 7. Therein, two switches 63 and 64 are coupled together to provide for the total switching function of the circuit 52. Each of the switches 63 and 64 couples a signal input terminal with any one of four output terminals. The input terminal of the switch 64 connects with one of the output terminals of the switch 63. The control address lines from the circuit 40 of FIG. 7 are applied to both of the switches 63 and 64 to accomplish the requisite interconnection of the two switches 63 and 64, as well as the coupling of the input terminals thereof to the respective output terminals for energization of the corresponding antennas of the cluster 26.

Microwave landing system receivers (not shown) such as disclosed in U.S. patent application Ser. No. 06/470,830 filed Feb. 28, 1983, incorporated herein by reference, are claimed by aircraft 22 of FIG. 1 for receiving the transmissions from MLS antennas. The signal as set forth in FIGS. 5 and 6 is demodulated by the receiver and the preamble is correlated to provide synchronization. Data, OCI, clearance and TO and FRO pulses are decoded. Successive scans of TO and FRO pulses are averaged to provide guidance information which a pilot uses to direct aircraft 22.

Figure 9:
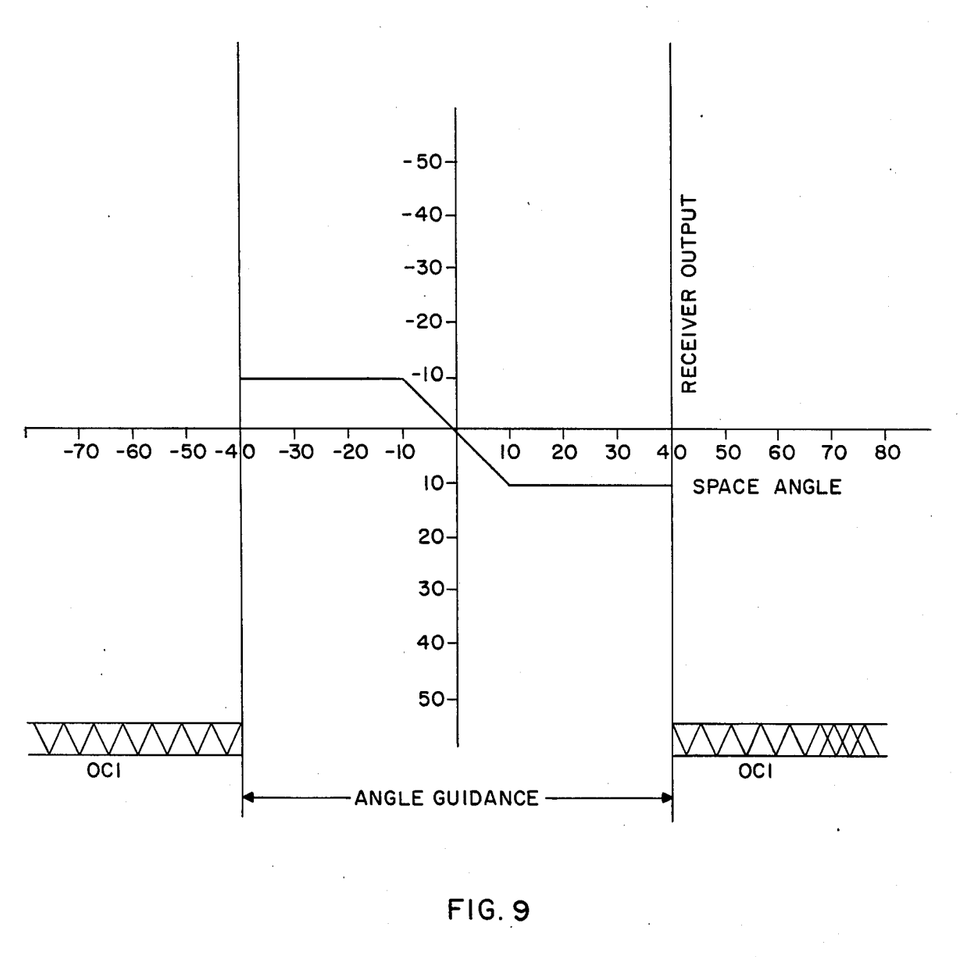
FIG. 9 shows the output of the airborne receiver before the aforementioned 90° clearance coverage provided by the invention.
Figure 10:
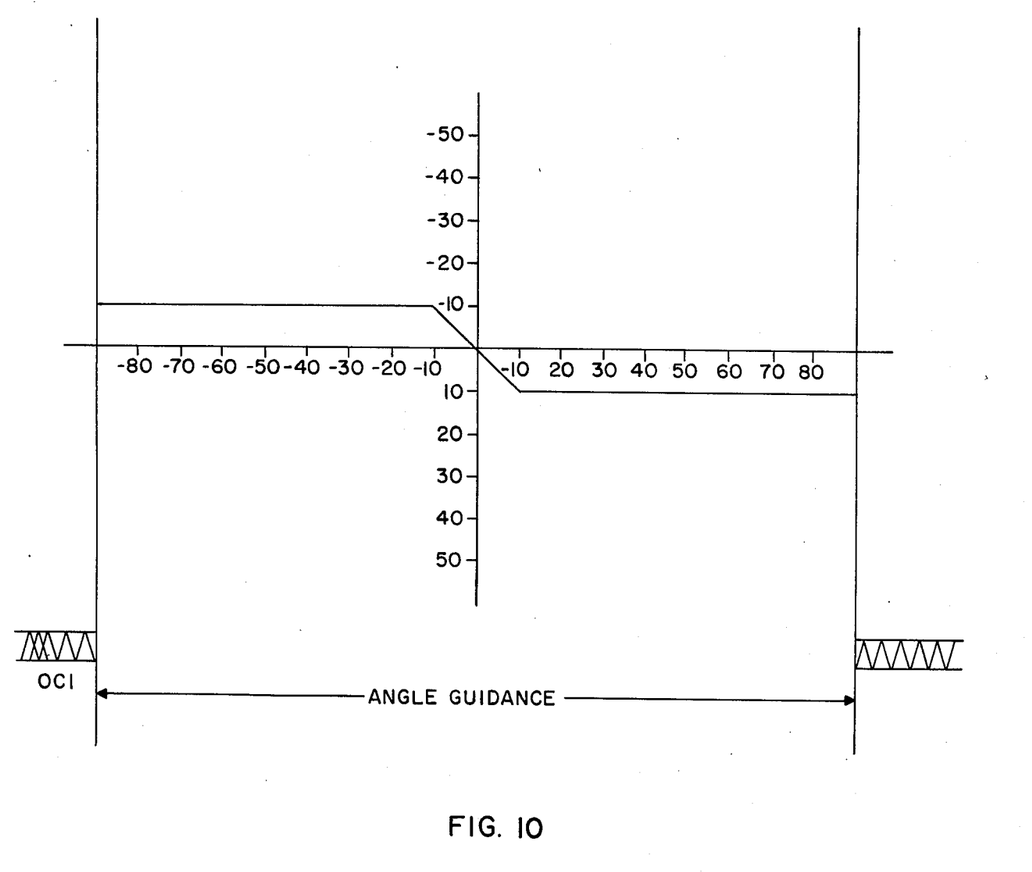
FIG. 10 shows the output of the airborne receiver for the aforementioned 90° clearance coverage provided by the invention.

With reference now to FIGS. 9 and 10, there are shown graphs of the output of the airborne receiver for the case of the 40° clearance coverage and for the case of the 90° clearance coverage. As has been explained above, the detection of the clearance signal for directing the airplane to turn right or to turn left depends on the relative magnitudes of the clearance signal compared to the amplitude of the OCI signal. In the case of the 40° coverage, wherein the OCI signal is transmitted from only one antenna at a time, as set forth in the diagram of FIG. 5, the magnitude of the clearance signal is greater than that of the OCI signal over the range of 40° to the right and left of the axis of FIG. 2. However, in the situation set forth in the diagram of FIG. 6 wherein the clearance signals are further transmitted from additional antennas and, additionally, the OCI signals are transmitted from additional antennas, the net result of the signal processing within the receiver is the relationship depicted in FIG. 10 wherein the magnitude of the clearance signal is greater than that of the OCI signal over the 90° sector coverage. Thus, the course correction signals for the aircraft 22 are presented over a region of coverage extending over sectors of 90° to either side of the axis of FIG. 2.

Figure 11:
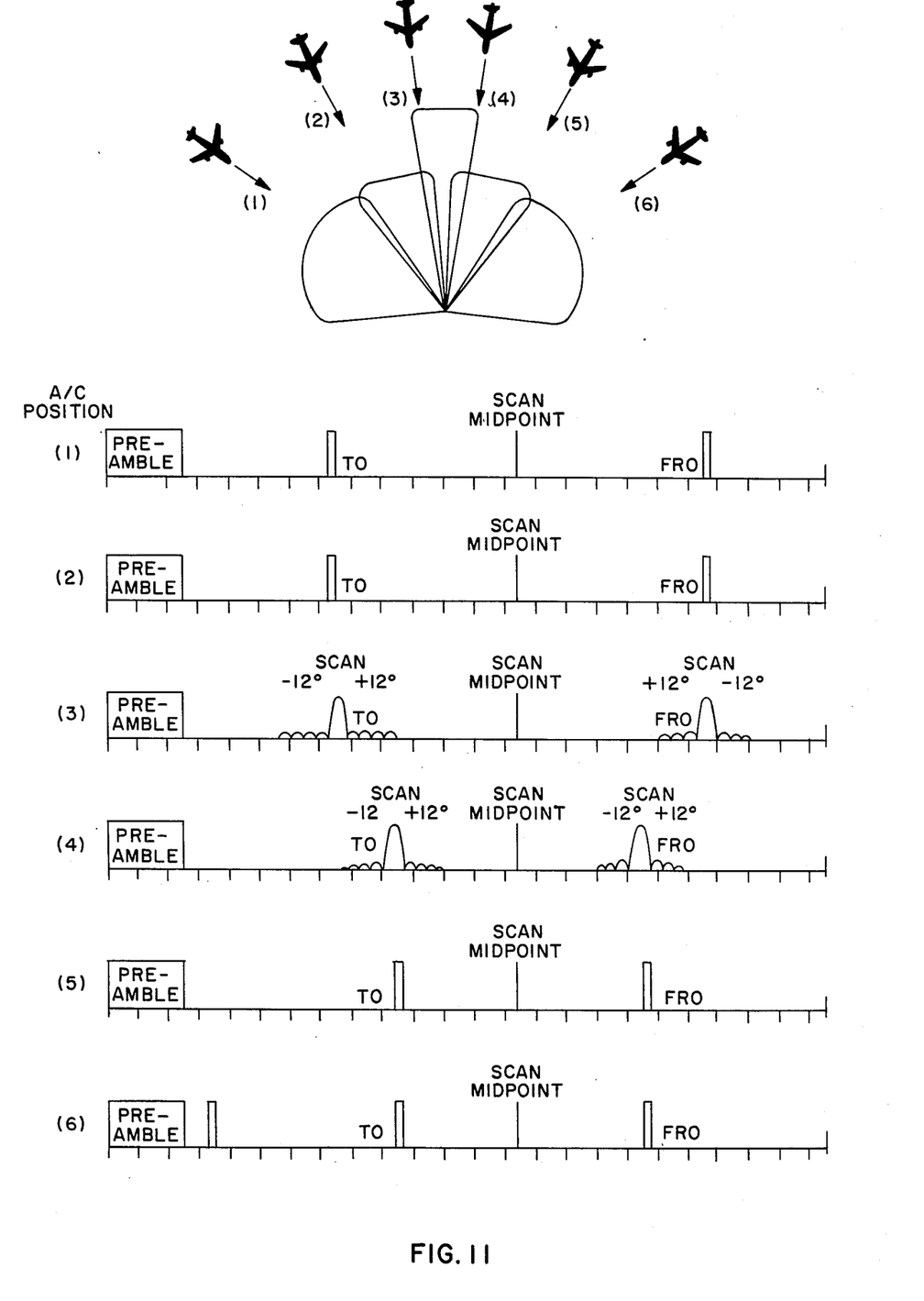
FIG. 11 includes a stylized view of aircraft flying within the radiation pattern of FIG. 2 and corresponding timing diagram depicting the signals of the scanning antenna.

The set of graphs in FIG. 11 further demonstrate the relationship between the signals received by the aircraft as a function of the aircraft position relative to the radiation patterns of the antenna cluster. As depicted in both FIGS. 5 and 6, the TO and FRO pulses, as well as the scans of the scanning beam occur both before and after the midpoint of the frame. For aircraft to the left of the central axis of the radiation pattern, the first three aircrafts of FIG. 11, the preceeding events relating to the scanning beam are seen to be preceived at different times from the perception of these events by the aircraft on the right side, namely the fourth, fifth and sixth aircraft. Since the scanning beam makes only two passes per frame, namely, one pass from the left to the right and, at the latter portion of the frame, a return pass from the right to the left, the aircrafts see a different set of events depending on which pulses are received on the respective sides of the radiation pattern. The resulting relationship among the pulses and the scanned beam is accordingly as depicted in FIG. 11.

Figure 12:
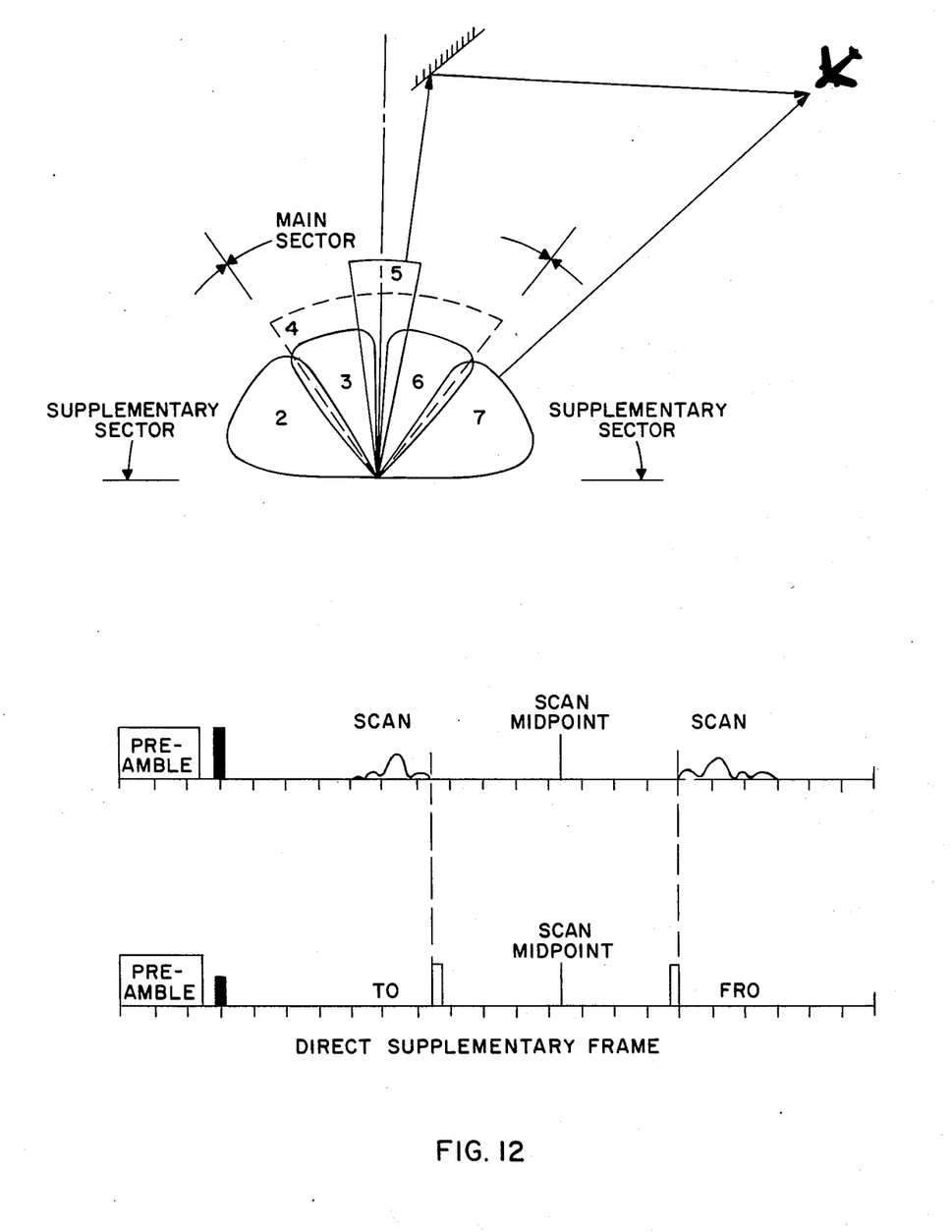
FIG. 12 depicts a multipath situation for an aircraft off to the side of the main axis of the array.
Figure 13:
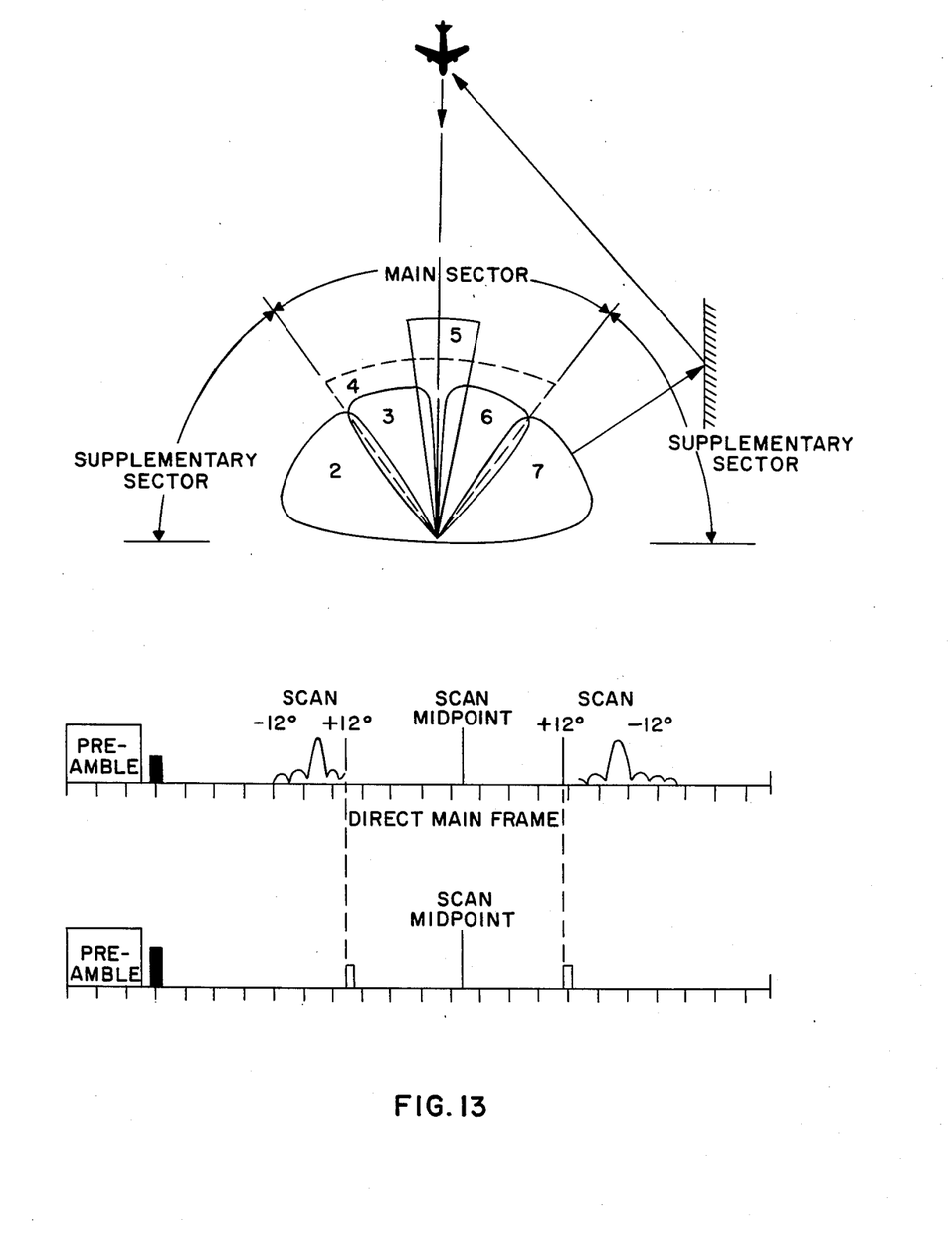
FIG. 13 shows a multipath situation for an aircraft on the axis of the array.

The effect of multipath is depicted in FIGS. 12 and 13 for an aircraft located off to the side of the axis of the radiation pattern, and for an aircraft located on the axis of the radiation pattern. Thus, in FIG. 12 there is depicted a situation wherein the aircraft is in the supplementary clearance coverage, and that there is a multipath signal from the proportional angle sector (near the center axis of the radiation pattern) into the supplementary clearance sector. Since the seventh antenna is used as an OCI antenna during the main frame, and is used as a clearance antenna during the supplementary frame, as shown in FIGS. 5 and 6, the airborne receiver will not decode the reflected signal during the main frame because of the signal radiated in the forward direction. However, the receiver will track the clearance signal during the supplementary frame since the clearance signal radiated by the seventh antenna is greater than the OCI signal radiated by the fourth antenna.

In FIG. 13, the aircraft is in the main sector, and lateral multipath radiation from the supplementary sector is reflected back into the main sector. During the main frame radiation, the OCI signal from the seventh antenna is reflected back into the proportional, or main, sector. However, the magnitude of the reflected OCI signal is less than the magnitude of the proportional guidance signal radiated by the fifth antenna; therefore, the receiver can decode and track the proportional guidance signal. In contrast, during the supplementary frame, the clearance signal radiated by the seventh antenna will be reflected into the main sector. Thus, if the preamble signal radiated by the seventh antenna and reflected into the main sector is sufficiently high in amplitude to be decoded by the receiver, the reflected clearance sgnal is less than the OCI signal radiated by the fourth antenna, and the receiver will be non-responsive to the signal reflected in the supplementary frames.

In view of the foregoing discussion of the situations depicted in FIGS. 12 and 13, it becomes apparent that the extended clearance coverage of the guidance sector out to 90° is maintained even in the presence of the multipath. This beneficial result is achieved by virtue of the supplementary frames in the signal transmission format, and in the utilization of time and coverage discrimination for maintaining the performance and integrity of the system 20.

It is to be understood that the above described embodiment of the invention is illustrative only, and that modifications thereof may occur to those skilled in the art. Accordingly, the invention is not to be regarded as limited to the embodiment disclosed herein, but is to be limited only as defined by the appended claims.

What is claimed is:

1. In an aircraft landing system employing a set of antennas for directing radiation along a flight path of an incoming aircraft, as well as to the left side thereof, to the right side thereof, and in the opposite direction thereof, and wherein signals are transmitted sequentially from successive ones of the antennas in differing directions relative to the flight path, a method of transmitting a signal providing for a ±90° azimuth clearance guidance information comprising the steps of transmitting a first sequence of guidance signals comprising the steps of:
   a. transmitting approach elevation information;
   b. transmitting main approach azimuth information thereafter;
   c. transmitting first, second, third and fourth basic data words of information thereafter;
   d. transmitting approach elevation information thereafter;
   e. transmitting supplementary approach azimuth information thereafter; and
   f. transmitting approach elevation information thereafter.

2. The method of claim 1 further comprising the steps of transmitting a second sequence after said first sequence comprising the steps of:
   a. transmitting approach elevation information;
   b. transmitting main approach azimuth information thereafter;
   c. transmitting the second basic data word of information thereafter;
   d. transmitting back azimuth information thereafter;
   e. transmitting approach elevation information thereafter;
   f. transmitting supplementry approach azimuth information thereafter; and
   g. transmitting approach elevation information thereafter.

3. The method of claim 2 wherein the total time duration of the first sequence and the second sequence is less than 134 milliseconds.

4. The method of claim 3 wherein said supplementary approach azimuth information includes preamble information having antenna select information transmitted by right and left out-of-coverage indication (OCI) antennas; followed by rear out-of-coverage information transmitted by a rear OCI antenna; followed by left out-of-coverage information transmitted by right and left clearance antennas; followed by right out-of-coverage information transmitted by a forward identification (DPSK) antenna.

5. The method of claim 4 wherein said supplementary approach azimuth information includes a "TO" test pulse transmitted by said right and left OCI antennas.

6. The method of claim 4 wherein said supplementary approach azimuth information includes a left clearance "TO" pulse and a left clearance "FRO" pulse transmitted by said left OCI antenna; a right clearance "TO" pulse and a right clearance "FRO" pulse transmitted by said right OCI antenna; and a "FRO" test pulse transmitted by both the right and left OCI antennas.

7. In a method of transmitting a signal by a microwave landing system (MLS) providing for ±360° data coverage information comprising the steps of transmitting sequence pairs wherein a first sequence of the sequence pairs includes the steps of:
   a. transmitting approach elevation information;
   b. transmitting approach azimuth information thereafter;
   c. transmitting approach elevation information thereafter;
   d. transmitting approach azimuth information thereafter; and
   e. transmitting approach elevation information thereafter;

and wherein the second sequence of the sequence pairs, said second sequence being transmitted after said first sequence, includes the steps of:
   f. transmitting approach elevation information thereafter;
   g. transmitting approach azimuth information thereafter;

h. transmitting approach elevation information thereafter; and i. transmitting approach elevation information thereafter; the improvement comprising the step of transmitting basic data words in an open time period between the above steps by an out-of-coverage (OCI) indication antenna.

8. The method of claim 7 wherein the total time duration of the first sequence and the second sequence is less than 134 milliseconds.

9. The method of claim 7 wherein said basic data words are transmitted by a rear out-of-coverage indication (OCI) antenna.

10. The method of claim 7 wherein said basic data words are transmitted by a right out-of-coverage indication (OCI) antenna.

11. The method of claim 7 wherein said basic data words are transmitted by a left out-of-coverage indication (OCI) antenna.

12. The method of claim 7 wherein said basic data words are also transmitted by a forward identification (DPSK) antenna.

13. The method of claim 7 wherein:
   a. during a first sequence pair the basic data words are transmitted by a rear out-of-coverage indication (OCI) antenna;
   b. during a second sequence pair the basic data words are transmitted by a left out-of-coverage indication (OCI) antenna and a right out-of-coverage indication (OCI) antenna; and
   c. during a third sequence pair the basic data words are transmitted by a forward identification (DPSK) antenna.

14. The method of claim 7 wherein said approach azimuth information comprises high rate approach azimuth information.

15. The method of claim 14 further comprising the steps of:
   a. transmitting the second basic data word; and
   b. transmitting back azimuth information thereafter.

16. The methd of claim 7 further comprising the steps of:
   a. transmitting the second basic data word; and
   b. transmitting back azimuth information thereafter.

17. An apparatus for transmitting a signal by a microwave landing system (MLS) providing for ±90° azimuth clearance guidance information comprising means for transmitting a first sequence comprising:
   a. means for transmitting approach elevation information;
   b. means for transmitting main approach azimuth information thereafter;
   c. means for transmitting first, second, third and fourth basic data words of information thereafter;
   d. means for transmitting approach elevation information thereafter;
   e. means for transmitting supplementary approach azimuth information thereafter; and
   f. means for transmitting approach elevation information thereafter.

18. The apparatus of claim 17 further comprising means for transmitting a second sequence after said first sequence comprising:
   a. means for transmitting approach elevation information;
   b. means for transmitting main approach azimuth information thereafter;
   c. means for transmitting the second basic data word of information thereafter;
   d. means for transmitting back azimuth information thereafter;
   e. means for transmitting approach elevation information thereafter;
   f. means for transmitting supplementary approach azimuth information thereafter; and
   g. means for transmitting approach elevation information thereafter.

19. The apparatus of claim 16 wherein said means for transmitting supplementary approach azimuth information includes means for transmitting the following: preamble information having antenna select information transmitted by right and left out-of-coverage indication (OCI) antennas; following by rear out-of-coverage information transmitted by a rear OCI antenna; followed by left out-of-coverage information transmitted by right and left clearance antennas; followed by right out-of-coverage information transmitted by a forward identification (DPSK) antenna.

20. The apparatus of claim 19 wherein said means for transmitting supplementary approach azimuth information includes means for transmitting a "TO" test pulse transmitted by said right and left OCI antennas.

21. The apparatus of claim 20 wherein said means for transmitting supplementary approach azimuth information includes means for transmitting the following: a left clearance "TO" pulse and a left clearance "FRO" pulse transmitted by said left OCI antenna; a right clearance "TO" pulse and a right clearance "FRO" pulse transmitted by said right OCI antenna; and a "FRO" test pulse transmitted by both the right and left OCI antennas.

22. In an apparatus for transmitting a signal by a microwave landing system (MLS) providing for ±360° data coverage information comprising means for transmitting a first sequence comprising:
   a. means for transmitting approach elevation information;
   b. means for transmitting approach azimuth information thereafter;
   c. means for transmitting approach elevation information thereafter;
   d. means for transmitting approach azimuth information thereafter; and
   e. means for transmitting approach elevation information thereafter;

means for transmitting a second sequence comprising:
   a. means for transmitting approach elevation information;
   b. means for transmitting approach azimuth information thereafter;
   c. means for transmitting approach elevation information thereafter;
   d. means for transmitting approach elevation information thereafter; and basic means for transmitting basic data words in a open time period, said basic means utilizing an out-of-coverage indication (OCI) antenna.

23. The apparatus of claim 22 wherein said basic means includes a rear out-of-coverage indication (OCI) antenna for transmitting the basic data words.

24. The apparatus of claim 22 wherein said basic means includes a right out-of-coverage indication (OCI) antenna for transmitting the basic data words.

25. The apparatus of claim 22 wherein said basic means includes a left out-of-coverage indication (OCI) antenna for transmitting the basic data words.

26. The apparatus of claim 22 wherein said basic means includes a forward identification (DPSK) antenna for transmitting the basic data words.

27. The apparatus of claim 22 wherein:
   a. said means for transmitting a first sequence includes a rear out-of-coverage indication (OCI) antenna;
   b. said means for transmitting a second sequence includes a left out-of-coverage indication (OCI) antenna and a right out-of-coverage indication (OCI) antenna; and
   c. said means for transmitting a third sequence includes a forward identification (DPSK) antenna, wherein each said antenna is for transmitting basic data words.

28. The apparatus of claim 26 wherein said means for transmitting approach azimuth information includes means for transmitting high rate approach azimuth information.

29. The apparatus of claim 28 further comprising:
   a. means for transmitting a second basic data word; and
   b. means for transmitting back azimuth information thereafter.

30. The apparatus of claim 22 further comprising:
   a. means for transmitting a second basic data word; and
   b. means for transmitting back azimuth information thereafter.

* * * * *